US010165319B2

(12) United States Patent
Chen et al.

(10) Patent No.: US 10,165,319 B2
(45) Date of Patent: Dec. 25, 2018

(54) ACCESS METHOD, APPARATUS, AND ACCESS SYSTEM

(71) Applicant: Huawei Technologies Co., Ltd., Shenzhen (CN)

(72) Inventors: Wei Chen, Shanghai (CN); Caixia Qi, Shanghai (CN); Yaowei Han, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 58 days.

(21) Appl. No.: 15/613,528

(22) Filed: Jun. 5, 2017

(65) Prior Publication Data

US 2017/0272801 A1    Sep. 21, 2017

Related U.S. Application Data

(63) Continuation of application No. PCT/CN2014/093129, filed on Dec. 5, 2014.

(51) Int. Cl.
*H04W 36/04* (2009.01)
*H04N 21/41* (2011.01)
(Continued)

(52) U.S. Cl.
CPC ......... *H04N 21/4126* (2013.01); *H04B 1/583* (2013.01); *H04W 36/14* (2013.01);
(Continued)

(58) Field of Classification Search
CPC ..... H04W 36/14; H04W 48/18; H04W 60/04; H04W 88/06; H04W 88/16
See application file for complete search history.

(56) References Cited

U.S. PATENT DOCUMENTS

2010/0173633 A1    7/2010    Catovic et al.
2011/0086635 A1    4/2011    Grob-Lipski
(Continued)

FOREIGN PATENT DOCUMENTS

CN    102647762 A    8/2012
CN    103392373 A    11/2013
(Continued)

OTHER PUBLICATIONS

NTT Docomo, "Restriction of Inter RAT handover/release with redirection/fast redirection between E-UTRAN and UTRAN/GERAN in case of roaming," SA WG2 Meeting #91, May 21-25, 2012, Kyoto, Japan, 3 pages.
(Continued)

*Primary Examiner* — Mohamed A Kamara
(74) *Attorney, Agent, or Firm* — Slater Matsil, LLP

(57) ABSTRACT

Embodiments of the present invention provide an access method and an apparatus. The method includes: receiving, by a converged mobility management network element, an access request of user equipment UE, where the access request is used to request to access a first network; obtaining, by the converged mobility management network element according to the access request, subscription data of the first network corresponding to the user equipment; when failing to obtain the subscription data, updating, by the converged mobility management network element, a continuous cumulative quantity of times; and when the continuous cumulative quantity of times meets a preset condition, sending, by the converged mobility management network element, first indication information to a base station device of a second network.

20 Claims, 4 Drawing Sheets

(51) Int. Cl.

| | | |
|---|---|---|
| *H04W 48/18* | (2009.01) | |
| *H04B 1/58* | (2006.01) | |
| *H04W 48/02* | (2009.01) | |
| *H04W 88/16* | (2009.01) | |
| *H04W 36/14* | (2009.01) | |
| *H04W 60/04* | (2009.01) | |
| *H04W 88/06* | (2009.01) | |

(52) U.S. Cl.
CPC ........... *H04W 48/02* (2013.01); *H04W 48/18* (2013.01); *H04W 88/16* (2013.01); *H04W 60/04* (2013.01); *H04W 88/06* (2013.01)

(56) References Cited

U.S. PATENT DOCUMENTS

| | | | |
|---|---|---|---|
| 2012/0189016 A1 | 7/2012 | Bakker et al. | |
| 2013/0157711 A1* | 6/2013 | Lee | H04W 48/18 455/525 |
| 2013/0215734 A1* | 8/2013 | Asghar | H04W 24/02 370/216 |
| 2014/0148169 A1 | 5/2014 | Li et al. | |
| 2015/0304904 A1* | 10/2015 | Li | H04W 36/0055 455/436 |
| 2016/0044736 A1 | 2/2016 | Duan et al. | |
| 2016/0302151 A1* | 10/2016 | Jung | H04W 76/18 |

FOREIGN PATENT DOCUMENTS

| | | |
|---|---|---|
| CN | 103415050 A | 11/2013 |
| CN | 103582036 A | 2/2014 |
| CN | 103634866 A | 3/2014 |

OTHER PUBLICATIONS

Huawei et al., "Clarification of E-UTRAN Service Handover IE for inter-RAT roaming restrictions," 3GPP TSG-RAN3 Meeting #78, R3-122826, New Orleans, USA, Nov. 12-16, 2012, 2 pages.

NTT Docomo, "Restriction of Inter RAT handover/release with redirection between E-UTRAN and UTRAN/GERAN," SA WG2 Meeting #94, S2-124812, New Orleans, USA, Nov. 12-16, 2012, 28 pages.

3rd Generation Partnership Project; Technical Specification Group Services and System Aspects; General Packet Radio Service (GPRS) Enhancements for Evolved Universal Terrestrial Radio Access Network (E-UTRAN) access (Release 13), 3GPP TS 23.401 V13.0.0 (Sep. 2014), 308 pages.

3rd Generation Partnership Project; Technical Specification Group Core Network and Terminals; Non-Access-Stratum (NAS) protocol for Evolved Packet System (EPS); Stage 3 (Release 12), 3GPP TS 24.301 V12.6.0 (Sep. 2014), 370 pages.

* cited by examiner

ACCESS METHOD, APPARATUS, AND ACCESS SYSTEM

CROSS-REFERENCE TO RELATED APPLICATIONS

This application is a continuation of International Application No. PCT/CN2014/093129, filed on Dec. 5, 2014, the disclosure of which is hereby incorporated by reference in its entirety.

TECHNICAL FIELD

The present invention relates to the field of communications technologies, and in particular, to an access method, an apparatus, and an access system.

BACKGROUND

Currently, a 4G network rapidly develops. In many countries and regions, on a basis of deployment of a 2G or 3G network, the 4G network is deployed. The 2G network and the 3G network may be classified into one category, referred to as a 2/3G network. User equipment supporting both the 2/3G network and the 4G network is widely popularized.

In a scenario in which both the 2/3G network and the 4G network are deployed, coverage areas of the 2/3G network and the 4G network overlap. When the user equipment moves to an overlapping coverage area of the 2/3G network and the 4G network, a base station device may preferably connect the user equipment to the 4G network.

In this scenario, the user equipment may encounter service interruption, causing poor service stability and bad user experience.

SUMMARY

Embodiments of the present invention provide an access method, an apparatus, and an access system, so as to improve service stability.

According to a first aspect, an embodiment of the present invention provides an access method. The method includes receiving, by a converged mobility management network element, an access request of user equipment UE, where the access request is used to request to access a first network. The method also includes obtaining, by the converged mobility management network element according to the access request, subscription data of the first network corresponding to the user equipment. The method also includes, when failing to obtain the subscription data, updating, by the converged mobility management network element, a continuous cumulative quantity of times, where the continuous cumulative quantity of times is used to indicate a cumulative quantity of continuous failures of accessing the first network by the user equipment. The method also includes, when the continuous cumulative quantity of times meets a preset condition, sending, by the converged mobility management network element, first indication information to a base station device of a second network, where the first indication information is used to instruct not to select the first network for the user equipment for access.

For example, the instructing not to select the first network for the user equipment for access herein may be understood as not selecting, within a period of time, the first network for the UE for access, that is, after this period of time, the base station device may preferably connect the UE to the first network again.

A phenomenon of frequent handover of UE between a first network and a second network is effectively relieved by counting a continuous cumulative quantity of times and when the continuous cumulative quantity of times meets a preset condition, instructing a base station device of the second network not to preferably connect the UE to the first network, thereby improving service stability.

With reference to the first aspect, in a first possible implementation manner of the first aspect, the method further includes: when failing to obtain the subscription data of the first network, sending, by the converged mobility management network element, second indication information to the user equipment, where the second indication information is used to indicate that current access to the first network by the user equipment is rejected. For example, after receiving the second indication information, the user equipment may re-request to access the first network after a period of time or immediately.

When failing to obtain the subscription data of the first network, the converged mobility management network element notifies the UE that current access to the first network is rejected, and the UE may be allowed to re-access the first network. Compared with excluding a probability of accessing the first network by the UE provided that the UE fails to access the first network once, such a technical means can avoid continuous access failures while increasing a probability of accessing the first network by the UE, so that impact on the network is reduced.

With reference to the first possible implementation manner of the first aspect, in a second possible implementation manner, the second indication information includes a cause value used to indicate implicit detach or a cause value used to indicate a protocol error unspecified.

After failing to access the first network, the UE may subsequently re-request to access the first network by using the cause value.

With reference to any one of the first aspect, the first possible implementation manner of the first aspect, or the second possible implementation manner of the first aspect, in a third possible implementation manner of the first aspect, the method further includes: when succeeding in obtaining the subscription data, resetting, by the converged mobility management network element, the continuous cumulative quantity of times.

Succeeding in obtaining the subscription data indicates that the UE may successfully access the first network. Therefore, the continuous cumulative quantity of times needs to be reset, so as to avoid incorrectly counting the continuous cumulative quantity of times.

Optionally, when the converged mobility management network element succeeds in obtaining the subscription data, regardless of whether the base station device of the second network was previously instructed not to preferably connect the UE to the first network, the converged mobility management network element may consider to instruct the base station device of the second network to preferably connect the UE to the first network.

With reference to any one of the first aspect or the first to the third possible implementation manners of the first aspect, in a fourth possible implementation manner of the first aspect, before the updating, by the converged mobility management network element, a continuous cumulative quantity of times, the method further includes: determining, by the converged mobility management network element, that no radio access technology access permission restriction information corresponding to the UE exists, or the radio access technology access permission restriction information corresponding to the UE indicates that the UE is allowed to access the first network. For example, it may be understood that, that no corresponding radio access technology access permission restriction information exists means that the UE is allowed to access the first network.

With reference to the fourth possible implementation manner of the first aspect, in a fifth possible implementation manner of the first aspect, the method further includes: when the radio access technology access permission restriction information corresponding to the UE indicates that the UE is not allowed to access the first network, sending, by the converged mobility management network element, the first indication information to the base station device.

When the radio access technology access permission restriction information exists, the converged mobility management network element first determines, according to radio access technology access permission restriction information, whether the UE is allowed to access the first network. If the UE is allowed to access the first network, the converged mobility management network element may continue to determine whether the UE can successfully access the first network. If the UE is not allowed to access the first network, the converged mobility management network element may directly instruct the base station of the second network not to connect the UE to the first network. In this way, UE that is definitely not allowed to access the first network may be directly not preferably connected to the first network, thereby avoiding meaninglessly and repetitively attempting to access the first network.

With reference to any one of the first aspect or the first to the fifth possible implementation manners of the first aspect, in a sixth possible implementation manner of the first aspect, the first indication information includes an information element used to indicate that the UE is not handed over to the first network.

With reference to any one of the first aspect or the first to the sixth possible implementation manners of the first aspect, in a seventh possible implementation manner of the first aspect, the converged mobility management network element includes a mobility management entity and a serving general packet radio service support node.

With reference to any one of the first aspect or the first to the seventh possible implementation manners of the first aspect, in an eighth possible implementation manner of the first aspect, the first network includes a Long Term Evolution network.

With reference to any one of the first aspect or the first to the eighth possible implementation manners of the first aspect, in a ninth possible implementation manner of the first aspect, the second network includes a general packet radio service network or a universal mobile telecommunications system network.

With reference to a second aspect, an embodiment of the present invention provides a converged mobility management network element, including: a transceiver unit, configured to receive an access request of user equipment UE, and obtain, according to the access request, subscription data of the first network corresponding to the UE, where the access request is used to request to access the first network; and a processing unit, configured to: when the transceiver unit fails to obtain the subscription data, update a continuous cumulative quantity of times, where the continuous cumulative quantity of times is used to indicate a cumulative quantity of continuous failures of accessing the first network by the UE, where the transceiver unit is further configured to: when the continuous cumulative quantity of times meets a preset condition, send first indication information to a base station device of a second network, where the first indication information is used to instruct not to select the first network for the UE for access.

With reference to the second aspect, in a first possible implementation manner of the second aspect, the transceiver unit is further configured to: when failing to obtain the subscription data of the first network, send second indication information to the UE, where the second indication information is used to indicate that current access to the first network by the UE is rejected. After receiving the second indication information, the UE may re-request to access the first network after a period of time or immediately.

With reference to the first possible implementation manner of the second aspect, in a second possible implementation manner of the second aspect, the second indication information includes a cause value used to indicate implicit detach or a cause value used to indicate a protocol error unspecified.

With reference to any one of the second aspect or the first or the second possible implementation manner of the second aspect, in a third possible implementation manner of the second aspect, the processing unit is further configured to: when the transceiver unit succeeds in obtaining the subscription data, reset the continuous cumulative quantity of times.

With reference to any one of the second aspect or the first to the third possible implementation manners of the second aspect, in a fourth possible implementation manner of the second aspect, the processing unit is further configured to determine that no radio access technology access permission restriction information corresponding to the UE exists, or the radio access technology access permission restriction information corresponding to the UE indicates that the UE is allowed to access the first network. For example, it may be understood that, that no corresponding radio access technology access permission restriction information exists means that the UE is allowed to access the first network.

With reference to the fourth possible implementation manner of the second aspect, in a fifth possible implementation manner of the second aspect, the transceiver unit is further configured to: when the radio access technology access permission restriction information corresponding to the UE indicates that the UE is not allowed to access the first network, send the first indication information to the base station device.

With reference to any one of the second aspect or the first to the fifth possible implementation manners of the second aspect, in a sixth possible implementation manner of the second aspect, the first indication information includes an information element used to indicate that the UE is not handed over to the first network.

With reference to any one of the second aspect or the first to the sixth possible implementation manners of the second aspect, in a seventh possible implementation manner of the second aspect, the converged mobility management network element includes a mobility management entity and a serving general packet radio service support node.

With reference to any one of the second aspect or the first to the seventh possible implementation manners of the second aspect, in an eighth possible implementation manner of the second aspect, the first network includes a Long Term Evolution LTE network.

With reference to any one of the second aspect or the first to the eighth possible implementation manners of the second aspect, in a ninth possible implementation manner of the second aspect, the second network includes a general packet radio service network or a universal mobile telecommunications system network.

According to a third aspect, an embodiment of the present invention further provides an access system, including one of the converged mobility management network elements and a base station device of a second network.

Further, the system may further include UE.

According to the access method, the apparatus, and the access system that are provided in the embodiments of the present invention, a phenomenon of frequent handover of UE between a first network and a second network is effectively relieved by counting a continuous cumulative quantity of times and when the continuous cumulative quantity of times meets a preset condition, instructing a base station device of the second network not to preferably connect the UE to the first network, thereby improving service stability.

For ease of understanding, descriptions of some concepts related to the present invention are illustratively provided below for reference.

The 3GPP is a project working on developing a wireless communications network. Generally, an organization related to 3GPP is referred to as a 3GPP organization.

A wireless communications network is a network providing a wireless communication function. In the wireless communications network, different communications technologies may be used, such as Code Division Multiple Access (CDMA), Wideband Code Division Multiple Access (WCDMA), Time Division Multiple Access (TDMA), Frequency Division Multiple Access (FDMA), Orthogonal Frequency Division Multiple Access (OFDMA), and Single Carrier Frequency Division Multiple Access (SC-FDMA). Networks may be classified into a 2G network, a 3G network, or a 4G network according to factors of different networks, such as capacities, rates, and delays. A typical 2G network includes a Global System for Mobile Communications (GSM) network or a general packet radio service (GPRS) network. A typical 3G network includes a Universal Mobile Telecommunications System (UMTS) network. A typical 4G network includes a Long Term Evolution (LTE) network. The UMTS network may be sometimes referred to as a Universal Terrestrial Radio Access Network (UTRAN). The LTE network may be sometimes referred to as an Evolved Universal Terrestrial Radio Access Network (E-UTRAN). Generally, the 2G network and the 3G network are classified into a category, referred to as a 2/3G network, and the 4G network is independently classified into a category. The technical solutions provided in the embodiments of the present invention are described by using the 2/3G network and the 4G network as examples. A person skilled in the art should learn that with development of technologies, the technical solutions provided in the embodiments of the present invention may also be applied to another wireless communications network, such as a 4.5G or 5G network. For brevity, in the embodiments of the present invention, the wireless communications network may be sometimes referred to as a network.

User equipment (UE) is a terminal device, and may be a movable terminal device, or may be an immovable terminal device. The device is mainly configured to receive or send service data, such as having a capability of receiving service data transmitted in an MBSFN manner. The user equipment may be distributed in a network. The user equipment has different names in different networks, such as a terminal, a mobile station, a subscriber unit, a station, a cellular phone, a personal digital assistant, a wireless modem, a wireless communications device, a handheld device, a laptop computer, a cordless phone, or a wireless local loop station. The user equipment may communicate with one or more core networks by using a radio access network (RAN), for example, exchange voice and/or data with the radio access network.

A base station (BS) device, which may also be referred to as a base station, is an apparatus that is deployed in the radio access network to provide a wireless communication function. For example, in the 2G network, devices providing a base station function include a base transceiver station (BTS) and a base station controller (BSC); in the 3G network, devices providing a base station function include a NodeB and a radio network controller (RNC); and in the 4G network, a device providing a base station function includes an evolved NodeB (eNB).

A mobility management network element (MMNE) is an apparatus that is deployed in a core network to perform mobility management on UE. For example, in the 2/3G network, a mobility management network element includes a serving GPRS support node (SGSN); and in the 4G network, a mobility management network element includes a mobility management entity (MME). In a scenario in which both the 2/3G network and the 4G network are deployed, mobility management network elements of the 2/3G network and the 4G network may be deployed on a same network element. This may also be referred to as co-locating the mobility management network elements of the 2/3G network and the 4G network on a same network element. The network element on which the mobility management network elements of the 2/3G network and the 4G network are disposed is generally referred to as a converged mobility management network element.

A home subscriber server (HSS) is an apparatus storing subscription data of UE of a 4G network, is generally deployed in a core network, and is connected to a mobility management network element of the 4G network.

A home location register (HLR) is an apparatus storing subscription data of UE of a 2/3G network, is generally deployed in a core network, and is connected to a mobility management network element of the 2/3G network.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A network architecture and a service scenario that are described in the embodiments of the present invention are intended to more clearly describe the technical solutions of the embodiments of the present invention, and shall not be construed as any limitation on the technical solutions provided in the embodiments of the present invention. A person of ordinary skill in the art may learn that the technical solutions provided in the embodiments of the present invention are also applicable to a similar technical problem with evolution of the network architecture and emergence of a new service scenario.

The following uses a scenario in which both a 2/3G network and a 4G network are deployed as an example for description.

Figure 1:
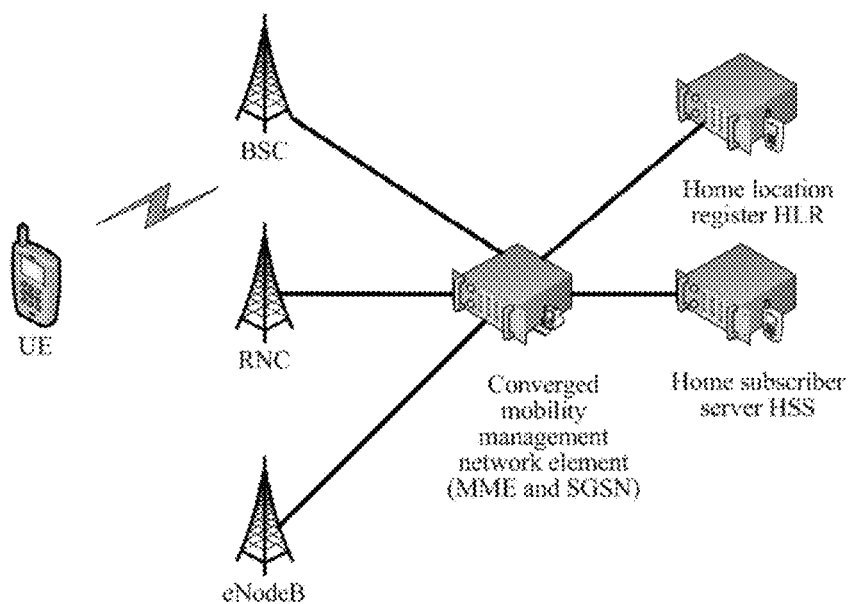
FIG. 1 is a schematic diagram of a networking architecture according to an embodiment of the present invention.

FIG. 1 is a schematic diagram of a network architecture in which both the 2/3G network and the 4G network are deployed. For ease of understanding, the network architecture shows only a converged mobility management network element, an HSS, an HLR, a base station device BSC of the 2G network, a base station device RNC of the 3G network, a base station device of the 4G network, and UE. A person skilled in the art should understand that a network element and a network architecture in actual deployment may be different from those shown in FIG. 1. A person skilled in the art should learn that the network architecture is merely an example of an application scenario in the embodiments of the present invention. For example, the network architecture may also be applied to a scenario in which both a 2G network and a 4G network are deployed, or a scenario in which both a 3G network and a 4G network are deployed.

The following is shown in FIG. 1.

The converged mobility management network element has functions of an MME and an SGSN, and is separately connected to the HSS, the HLR, the BSC, the RNC, and an eNodeB.

The UE can support the 2/3G network and the 4G network, that is, support wireless communication with the base station of the 2/3G network, and the base station of the 4G network. A large quantity of UEs exist in an actual wireless communications network.

The HSS is configured to store subscription data of the UE. When a user of the UE subscribes to the 2G network with a mobile operator so as to perform a service, the HSS stores subscription data of the 2G network corresponding to the UE. This indicates that the UE may access the 2G network to perform the service. Similarly, when a user of the UE subscribes to the 3G or 4G network with a mobile operator so as to perform a service, the HSS stores subscription data of the 3G or 4G network corresponding to the UE. This indicates that the UE may access the 3G network or the 4G network. Accordingly, for example, when no subscription data of the 4G network exists in the HSS, a request for accessing the 4G network by the UE is rejected. For ease of description, that a user of the UE subscribes to the 2G, 3G, or 4G network may also be referred to as that the UE subscribes to the 2G, 3G, or 4G network.

In a scenario in which both the 2/3G network and the 4G network are deployed, coverage areas of the 2/3G network and the 4G network overlap. The UE may perform, in an overlapping coverage area, wireless communication with any one of the BSC, the RNC, or the eNodeB.

Because the 4G network is not commercially used for a long time, a large quantity of UEs that can support the 2/3G network and the 4G network exist in the network. However, a user of the UE may subscribe to only the 2/3G network with the operator, and has not subscribed to the 4G network. After the UE accesses the 2/3G network, because the UE supports the 4G network, the base station device of the 2/3G network preferably connects the UE to the 4G network. However, because the UE has not subscribed to the 4G network, access to the 4G network is rejected, and then the UE accesses the 2/3G network again. After the UE accesses the 2/3G network again, the base station device of the 2/3G network preferably connects the UE to the 4G network again. As a result, the UE is frequently handed over between the 2/3G network and the 4G network, causing a ping-pong phenomenon, which imposes impact on the network and brings about service instability.

To resolve the foregoing problem, establishing a buffer mechanism may be considered. That is, the UE is allowed to attempt multiple times to request to access the 4G network. However, when a cumulative quantity of continuous failures of accessing the 4G network by the UE meet a preset condition, the base station of the 2/3G network may be prohibited from preferably connecting the UE to the 4G network. This may avoid that the UE is frequently handed over between the 2/3G network and the 4G network, thereby improving service stability. In addition, a validity period may be set for time of prohibiting from preferably connecting the UE to the 4G network, so that the UE may be preferably connected to the 4G network once the user of the UE subscribes to the 4G network with the operator.

As one of the implementation manners, implementing the buffer mechanism on the converged mobility management network element may be preferentially considered. For example, the buffer mechanism may be introduced into a process of requesting access by the UE. To more clearly describe the technical solutions in the embodiments of the present invention, descriptions are made in the following with reference to the network architecture shown in FIG. 1.

For ease of understanding, it is assumed that the cumulative quantity of continuous failures of accessing the 4G network by the UE reach 3, and then the base station of the 2/3G network is prohibited from preferably connecting the UE to the 4G network. In the embodiments of the present invention, descriptions are made by using an example in which the 4G network is an LTE network, the 2G network is a GPRS network, and the 3G network is a UMTS network.

Figure 2:
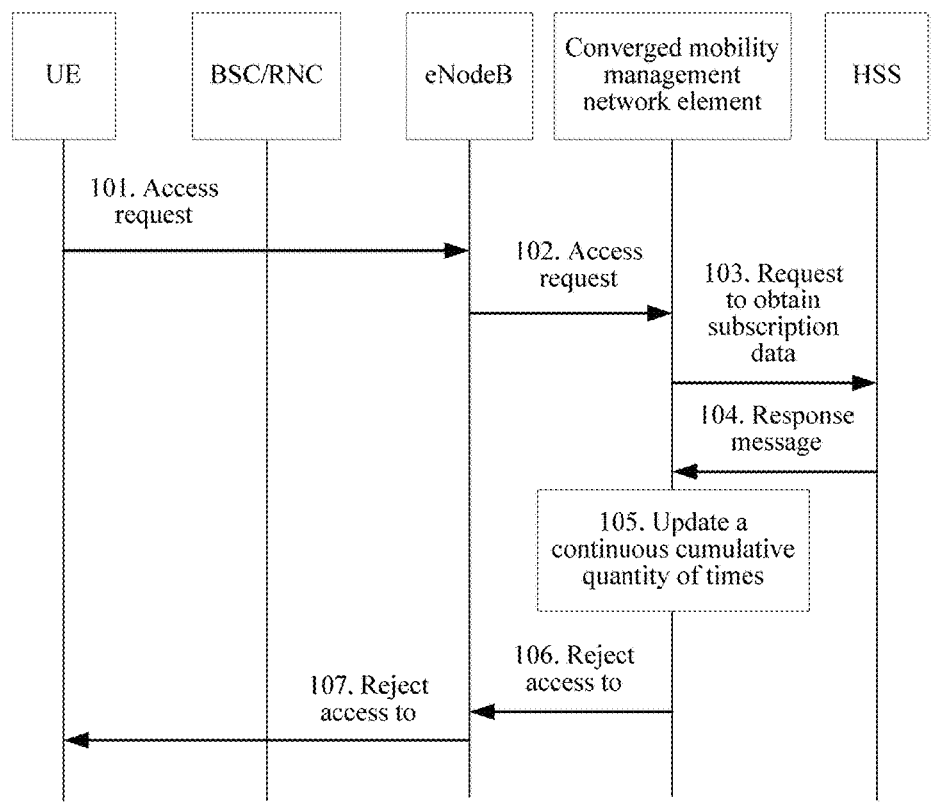
FIG. 2 is a schematic flowchart of an access method according to an embodiment of the present invention.

For example, FIG. 2 shows a schematic flowchart of an access method. The buffer mechanism is introduced into the access method shown in FIG. 2, and processes of accessing a 4G network by UE for the first time and for the second time are mainly described. As shown in FIG. 2, the method includes the following steps.

101. UE sends an access request to an eNodeB, that is, the UE selects a 4G network for access. The access request is used to request to access the 4G network.

For example, the UE may select the 4G network for access at the first time of network selection after the UE is powered on, or the UE may first access a 2/3G network, and then the UE selects the 4G network for access or a base station device of the 2/3G network makes, by means of redirection or a handover process, the UE select the 4G network for access.

For example, the access request may be an attach request or a tracking area update (TAU) request.

102. The eNodeB forwards the access request of the UE to a converged mobility management network element.

By means of steps 101 and 102, the converged mobility management network element learns that the UE requests to access the 4G network. After receiving the access request of the UE, the converged mobility management network element may request to obtain subscription data of the 4G network corresponding to the UE. If the converged mobility management network element cannot obtain the subscription data of the 4G network corresponding to the UE, access to the 4G network by the UE is rejected. For example, the requesting, by the converged mobility management network element, to obtain the subscription data of the 4G network corresponding to the UE may be shown in steps 103 and 104.

103. The converged mobility management network element requests, from the HSS, subscription data of the 4G network corresponding to the UE.

For example, the converged mobility management network element may request the subscription data of the 4G network corresponding to the UE by sending an update location request to the HSS. The update location request may include a UE ID (identity) of the UE, so as to instruct to obtain the subscription data of the 4G network corresponding to the UE of the UE ID.

104. The HSS returns a response message to the converged mobility management network element.

Because the UE has not subscribed to the 4G network, no subscription data of the 4G network corresponding to the UE exists in the HSS. Therefore, the subscription data of the 4G network corresponding to the UE is not carried in the response message. Optionally, indication information may be carried in the response message, so as to indicate that there is no subscription data of the 4G network corresponding to the UE. For example, the response message may be an update location Ack. When a value of a Result information element in the message is DIAMETER_ERROR_USER_UNKNOWN(5001), DIAMETER_ERROR_UNKNOWN_EPS_SUBSCRIPTION(5420), DIAMETER_ERROR_RAT_NOT_ALLOWED(5421), or DIAMETER_ERROR_ROAMING_NOT_ALLOWED (5004), it indicates that the subscription data of the 4G network corresponding to the UE cannot be obtained.

Optionally, the converged mobility management network element may request multiple times to obtain the subscription data of the 4G network corresponding to the UE after step 102, that is, when the converged mobility management network element obtains no subscription data of the 4G network corresponding to the UE after steps 103 and 104, the converged mobility management network element may attempt to obtain the subscription data of the 4G network corresponding to the UE again by means of steps 103 and 104. This may avoid that the subscription data of the 4G network corresponding to the UE cannot be obtained due to another cause. For example, a connection between the converged mobility management network element and the HSS is temporarily interrupted or the HSS is overloaded.

Steps 103 and 104 apply to a scenario in which the converged mobility management network element can interact with the HSS.

In a scenario in which the converged mobility management network element and the HSS cannot interact with each other, the converged mobility management network element cannot obtain the subscription data of the 4G network corresponding to the UE, either, that is, the converged mobility management network element fails to obtain the subscription data of the 4G network corresponding to the UE. For example, when the UE is a roaming subscriber, it is possible that interaction cannot be performed because no interface for connection exists between an HSS of a home network of the UE and a converged mobility management network element of a network that the UE currently roams in.

In both of the foregoing two scenarios, a case of failing to obtain the subscription data of the 4G network corresponding to the UE occurs. In this case, the converged mobility management network element rejects access to the 4G network by the UE, that is, it may be considered that current requesting to access the 4G network by the UE fails.

105. The converged mobility management network element updates a continuous cumulative quantity of times.

The continuous cumulative quantity of times is used to indicate a cumulative quantity of continuous failures of accessing the 4G network by the UE. For example, it is assumed that an initial value of the continuous cumulative quantity of times is 0. If accessing the 4G network by the UE for the first time fails, the continuous cumulative quantity of times indicates that the UE fails to access the 4G network once. If accessing the 4G network by the UE for the second time fails again, the continuous cumulative quantity of times indicates that the UE fails to access the 4G network twice. If accessing the 4G network by the UE for the third time succeeds, the continuous cumulative quantity of times turns into the initial value. If accessing the 4G network by the UE for the fourth time fails again, the continuous cumulative quantity of times indicates that the UE fails to access the 4G network once.

A person skilled in the art should understand that the continuous cumulative quantity of times may be differently described from different perspectives, but all descriptions share a same essence. For example, the continuous cumulative quantity of times may be considered as a cumulative quantity of times that the converged mobility management network element continuously rejects access to the 4G network by the UE. For another example, the continuous cumulative quantity of times may be considered as a cumulative quantity of continuous failures of obtaining the subscription data of the 4G network corresponding to the UE. During one request of the UE for access, multiple failures of obtaining the subscription data of the 4G network corresponding to the UE are considered as one obtaining failure.

As implementation of counting the continuous cumulative quantity of times, disposing a counter on the converged mobility management network element for the UE and setting an initial value for the counter may be considered. For example, the counter may be created when the UE accesses the 2/3G network corresponding to the converged mobility management network element for the first time or the UE requests, for the first time from the converged mobility management network element, access to the 4G network. The counter may be stored in a context corresponding to the UE. When the obtaining the subscription data of the 4G network corresponding to the UE fails, a value of the counter may be increased by 1. When the UE succeeds in accessing the 4G network, the counter may be reset to the initial value. A person skilled in the art should understand that counting of the continuous cumulative quantity of times may be implemented in another manner, such as disposing a down counter. A value of the counter is reduced by 1 after each failure. Details are not described herein.

When the continuous cumulative quantity of times does not meet a preset condition (it is assumed herein that the preset condition is that a continuous cumulative quantity of times reaches 3), it indicates that the UE may be allowed to re-request to access the 4G network. Therefore, notifying the UE that the current request for accessing the 4G network is rejected, but the UE may re-attempt to access the 4G network may be considered. Herein, after the current request for accessing the 4G network is rejected, the re-attempting to access the 4G network may be performed immediately or after a period of time. The notification may be implemented by performing steps 106 and 107.

106. The converged mobility management network element sends an access rejection message to the eNodeB.

107. The eNodeB forwards the access rejection message to the UE.

To be capable of notifying the UE that the current request for accessing the 4G network is rejected, but the UE may re-attempt to access the 4G network, adding indication information (for ease of description, the indication information herein may be referred to as second indication information) to the access rejection message may be considered. As an optional implementation manner, the second indication information may be a rejection cause value (which may be referred to as a cause value for short) #10 or #111. The cause value #10 is used to indicate implicit detach, and the cause value #111 is used to indicate a protocol error unspecified. The cause value #10 and the cause value #111 are relatively moderate cause values. When receiving a relatively moderate cause value, the UE re-attempts to access the 4G network. On the contrary, there is a relatively strong cause value, such as a cause value #15, which is used to indicate that there is no suitable cells in a tracking area. When receiving the relatively strong cause value, the UE does not re-attempt to access the 4G network. A person skilled in the art should learn that the relatively moderate cause value is not limited to the cause value #10 or #111.

In steps 101 to 107, a process of requesting to access the 4G network by the UE for the first time is described. After accessing the 4G network for the first time fails, the continuous cumulative quantity of times indicates that the cumulative quantity of continuous failures of accessing the 4G network by the UE is 1.

Later, the UE may directly re-request to access the 4G network, or may first select the 2/3G network for access, and then re-request to access the 4G network proactively or after being triggered by the base station of the 2/3G network.

For a process of requesting to access the 4G network by the UE for the second time, refer to descriptions in steps 101 to 107. Details are not described herein again. Because the UE has not subscribed to the 4G network, requesting to access the 4G network by the UE for the second time is also rejected. After accessing the 4G network for the second time fails, the continuous cumulative quantity of times indicates that the cumulative quantity of continuous failures of accessing the 4G network by the UE are 2.

Figure 3:
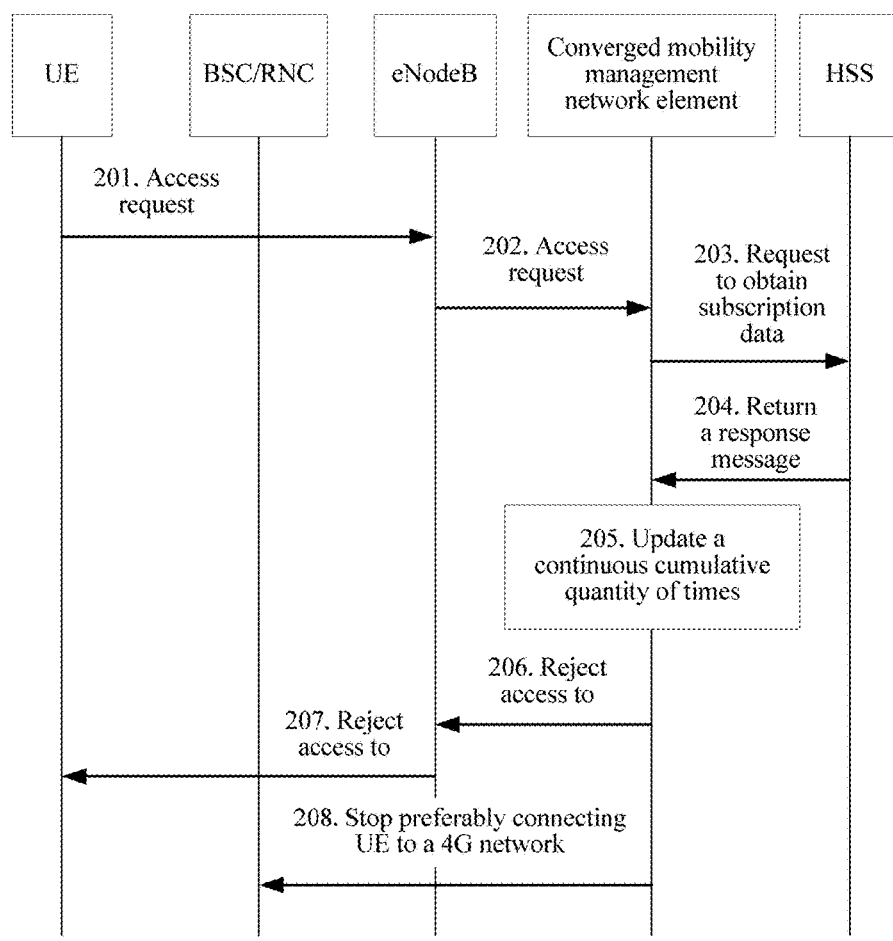
FIG. 3 is another schematic flowchart of an access method according to an embodiment of the present invention.

For a process of requesting to access the 4G network by the UE for the third time, refer to a schematic flowchart shown in FIG. 3. As shown in FIG. 3, the process includes the following steps.

201. UE sends an access request to an eNodeB.

202. The eNodeB forwards the access request of the UE to a converged mobility management network element.

203. The converged mobility management network element requests, from an HSS, subscription data of a 4G network corresponding to the UE.

204. The HSS returns a response message to the converged mobility management network element.

205. The converged mobility management network element updates a continuous cumulative quantity of times.

For detailed description of steps 201 to 205, refer to steps 101 to 105. Details are not described herein again.

After step 205, the continuous cumulative quantity of times is updated to 3. Because a previously preset condition is that the continuous cumulative quantity of times reaches 3, the current continuous cumulative quantity of times has already met the preset condition. In this case, instructing a base station device of the 2/3G network not to preferably connect the UE to the 4G network may be considered. This may avoid that the UE is frequently handed over between the 2/3G network and the 4G network, thereby alleviating pressure on the network, and helping keep service stability.

As an optional implementation manner, the converged mobility management network element may consider to send indication information to instruct the base station device of the 2/3G network not to preferentially connect the UE to the 4G network (for ease of description, the indication information herein may be referred to as first indication information). For example, 208. The converged mobility management network element sends first indication information to a BSC/RNC. The first indication information is used to instruct the BSC/RNC not to select the 4G network for the UE for access.

For example, the converged mobility management network element may send the first indication information to the RNC by using an RAB ASSIGNMENT REQUEST message or a RELOCATION REQUEST message. A value of an E-UTRAN Service Handover information element in the two messages may be set to "Handover to E-UTRAN shall not be performed", so as to represent the first indication information.

For example, the converged mobility management network element may send the first indication information to the BSC by using a Create BSS Packet Flow Context Request message or a DL-UNITDATA message. A value of a Service UTRAN COO information element in the two messages may be set to "Network initiated cell change order to E-UTRAN procedure shall be performed", so as to represent the first indication information.

After the BSC/RNC receives the first indication information, and after the UE accesses the 2/3G network, the BSC/RNC does not preferably select the 4G network for the UE for access. Therefore, the UE is not frequently handed over between the 2/3G network and the 4G network, thereby relieving a ping-pong phenomenon, and improving service stability to some extent.

For example, the instructing not to select the 4G network for the user equipment for access herein may be understood as not selecting, within a period of time, the 4G network for the user equipment for access, that is, after this period of time, the base station device may preferably connect the user equipment to the 4G network again.

After step 205, the converged mobility management network element further notifies the UE that current access to the 4G network by the UE is rejected. For example, 206. The converged mobility management network element sends an access rejection message to the eNodeB.

207. The eNodeB forwards the access rejection message to the UE.

For detailed description of steps 206 and 207, refer to steps 106 and 107. Details are not described herein again.

It should be noted that there is no time sequence relationship between steps 206 and 207 and step 208. In steps 206 and 207, the converged mobility management network element still sends a relatively moderate rejection cause value to the UE, so that the UE may proactively initiate access to the 4G network after subscribing to the 4G network.

Optionally, when radio access technology access permission restriction information is configured for the UE, after step 102 or 202, the converged mobility management network element may first determine whether the radio access technology access permission restriction information indicates that the UE is allowed to access the 4G network. If the UE is allowed to access the 4G network, starting the foregoing buffer mechanism may be further considered. The radio access technology access permission restriction information may be configured on the converged mobility management network element, or may be configured on the HSS. For example, when the radio access technology access permission restriction information of the UE is configured on the converged mobility management network element, it may be first determined, before step 103 or 203, that the radio access technology access permission restriction information indicates that the UE is allowed to access the 4G network, and then a subsequent step is performed. For another example, when the radio access technology access permission restriction information of the UE is configured on the HSS, it may be first determined, after step 104 or 204, that the radio access technology access permission restriction information indicates that the UE is allowed to access the 4G network, and then a subsequent step is performed.

Optionally, when the radio access technology access permission restriction information indicates that the UE is not allowed to access the 4G network, the converged mobility management network element may directly perform steps 206 to 208.

Optionally, if the UE first accesses the 2/3G network, when the UE requests to access the 2/3G network, the converged mobility management network element may determine whether the radio access technology access permission restriction information of the UE indicates that the UE is allowed to access the 4G network. If the UE is not allowed to access the 4G network, step 208 may be directly performed, thereby avoiding that the UE is preferably connected to the 4G network.

Optionally, considering that radio access technology access permission restriction information is not configured for all UEs, before it is determined whether the radio access technology access permission restriction information indicates that the UE is allowed to access the 4G network, it may be first determined whether the radio access technology access permission restriction information is configured for the UE.

Optionally, when the converged mobility management network element succeeds in obtaining the subscription data of the 4G network corresponding to the UE during an access process of the UE, the converged mobility management network element may accept the request for accessing the 4G network by the UE, and reset the continuous cumulative quantity of times of the UE to the initial value, so that the continuous cumulative quantity of times can be re-counted when the UE requests, next time, to access the 4G network.

Optionally, a validity period may be set for the continuous cumulative quantity of times. For example, when the continuous cumulative quantity of times is updated for the first time, a timer may be started. After the timer times out, the continuous cumulative quantity of times is reset. This may allow the UE to infrequently attempt to access the 4G network. Therefore, impact on the network is relatively slight.

Optionally, when the UE may succeed in accessing the 4G network, regardless of whether the base station device of the 2/3G network was previously instructed not to preferably connect the UE to the 4G network, the converged mobility management network element may consider to instruct the base station device of the 2/3G network to preferably connect the UE to the 4G network.

It may be learned from the foregoing description of the access method provided in this embodiment of the present invention that, during a process of accessing the 4G network by the UE, the base station device of the 2/3G network is instructed not to preferably connect the UE to the 4G network after the UE is allowed several times to access the 4G network. This ensures that the UE has an opportunity to access the 4G network, and relieves impact on the network caused due to frequent handover between the 4G network and the 2/3G network, thereby improving service stability, and enhancing user experience.

It should be noted that the 2/3G network and the 4G network in this embodiment of the present invention are merely examples, and shall not be construed as any limitation on wireless communications networks in this embodiment of the present invention. For ease of description, networks similar to the 4G network, that is, networks that may be preferably accessed, may be classified into a category, referred to as a first network. On the contrary, networks similar to the 2/3G network, that is, networks whose base station devices preferably connect the UE to the first network, may be classified into a category, referred to as a second network. Therefore, the 4G network and the 2/3G network in FIG. 2 and FIG. 3 may be respectively replaced with the first network and the second network.

To implement the access method provided in this embodiment of the present invention, an existing converged mobility management network element needs to be modified.

Figure 4:
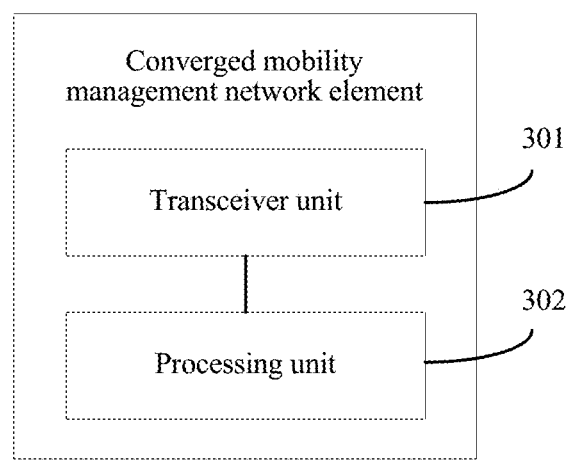
FIG. 4 is a schematic structural diagram of a converged mobility management network element according to an embodiment of the present invention.

As shown in FIG. 4, generally, a converged mobility management network element includes a transceiver unit 301 and a processing unit 302.

To implement receiving of an access request in steps 101 and 102 (or steps 201 and 202), the transceiver unit 301 may be configured to receive the access request of the UE. The request is used to request to access a first network.

To implement obtaining of subscription data of a 4G network (that is, the first network) corresponding to the UE in steps 103 and 104 (or steps 203 and 204), the transceiver unit 301 may be configured to obtain the subscription data of the 4G network corresponding to the UE. As an optional implementation manner, the transceiver unit 301 may be configured to request, from an HSS, the subscription data of the 4G network corresponding to the UE and receive a response message returned by the HSS.

To implement updating of a continuous cumulative quantity of times in step 105 (or step 205), the processing unit 302 may be configured to update the continuous cumulative quantity of times of the UE. Optionally, the continuous cumulative quantity of times of the UE may be stored in a cache of the processing unit 302, or may be stored in an external storage unit of the processing unit 302.

To implement instructing a base station device of a 2/3G network (that is, the second network) not to select the 4G network for the UE for access in step 208, the transceiver unit 301 may send first indication information in step 208 to the base station device of the second network when the continuous cumulative quantity of times meets a preset condition. The first indication information is used to instruct not to select the first network for the UE for access.

To implement instructing the UE to re-request to access the 4G network in steps 106 and 107 (or steps 206 and 207), the transceiver unit 301 may send second indication information to the base station device of the second network when failing to obtain the subscription data of the 4G network. The second indication information is used to indicate that current access to the first network by the UE is rejected. For example, after receiving the second indication information, the UE re-requests to access the first network after a period of time or immediately. For example, when the transceiver unit 301 fails to obtain the subscription data of the first network, the processing unit 302 may instruct the transceiver unit 301 to send the second indication information to the base station device of the second network. It may be understood that the foregoing implementation manner is merely an example. In a specific implementation process, another implementation manner may further exist. This is not limited herein.

Optionally, the processing unit 302 may be further configured to: when the transceiver unit 301 succeeds in obtaining the subscription data of the first network corresponding to the UE, reset the continuous cumulative quantity of times of the UE.

Optionally, the processing unit 302 may further determine that no radio access technology access permission restriction information corresponding to the UE exists, or the radio access technology access permission restriction information corresponding to the UE indicates that the UE is allowed to access the first network.

Optionally, the transceiver unit 301 may further send the first indication information to the base station device of the second network when the radio access technology access permission restriction information corresponding to the UE indicates that the UE is not allowed to access the first network. For example, the processing unit 302 may be further configured to instruct the transceiver unit 301 to send the first indication information to the base station device of the second network when the radio access technology access permission restriction information corresponding to the UE indicates that the UE is not allowed to access the first network. It may be understood that the foregoing implementation manner is merely an example. In a specific implementation process, another implementation manner may further exist. This is not limited herein.

As an implementation manner, implementing functions of the transceiver unit 301 by using a transceiver circuit or a transceiver-dedicated chip may be considered. Implementing the processing unit 302 by using a dedicated processing chip, a processing circuit, a processor, or a general purpose chip may be considered.

As another implementation manner, implementing, by using a general purpose computer, the converged mobility management network element provided in this embodiment of the present invention may be considered. That is, program code implementing functions of the transceiver unit 301 and the processing unit 302 is stored in a memory, and the processor implements the functions of the transceiver unit 301 and the processing unit 302 by executing the code in the memory.

For explanation and detailed description of concepts that are related to the technical solutions provided in this embodiment of the present invention and that are involved in the converged mobility management network element shown in FIG. 4, refer to content about these concepts in the methods shown in FIG. 2 and FIG. 3. Details are not described herein again.

The converged mobility management network element provided in this embodiment of the present invention may effectively intervene in and control frequent handover of UE between a first network and a second network by executing a buffer mechanism provided in this embodiment of the present invention, thereby relieving impact on a network, improving service stability, and ensuring user experience.

A person skilled in the art may understand that from a perspective of a system, a system including the converged mobility management network element shown in FIG. 4 and the base station device of the 2/3G network, or a system including the converged mobility management network element shown in FIG. 4, the base station device of the 2/3G network, and the UE may relieve impact on the network caused by the ping-pong phenomenon, thereby improving service stability, and ensuring user experience.

A person skilled in the art can understand that information and a signal may be represented by using any technology technique, for example, the information and the signal may be data, an instruction, a command, information, a signal, a bit, a symbol, or the like. The technology technique may be using a voltage, a current, an electromagnetic wave, a magnetic field or magnetic particles, or an optical field or optical particles.

A person skilled in the art may further understand that various illustrative logical blocks and steps that are listed in the embodiments of the present invention may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the protection scope of the embodiments in the present invention.

The various illustrative logical units and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software unit executed by a processor, or a combination thereof. The software unit may be stored in a RAM memory, a flash memory, a ROM memory, an EPROM memory, an EEPROM memory, a register, a hard disk, a movable magnetic disk, a CD-ROM, or a storage medium of any other form in the art. For example, the storage medium may connect to a processor so that the processor may read information from the storage medium and write information into the storage medium. Optionally, the storage medium may further be integrated into a processor. The processor and the storage medium may be disposed in an ASIC, and the ASIC may be disposed in UE. Optionally, the processor and the storage medium may also be disposed in different parts of the UE.

In one or more example designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber cable, a twisted pair, a digital subscriber line (DSL) or in a wireless manner, such as infrared, radio, or microwave, the software is included in a defined computer-readable medium. The disk and the disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A method, comprising:
   receiving, by a converged mobility management network element, an access request of user equipment (UE), wherein the access request requests to access a first network;
   attempting to obtain, by the converged mobility management network element according to the access request, subscription data of the first network corresponding to the UE;
   when failing to obtain the subscription data, updating, by the converged mobility management network element, a continuous cumulative quantity of times, wherein the continuous cumulative quantity of times indicates a cumulative quantity of continuous failures of accessing the first network by the UE; and
   when the continuous cumulative quantity of times meets a preset condition, sending, by the converged mobility management network element, first indication information to a base station device of a second network, wherein the first indication information instructs not to select the first network for the UE for access.

2. The method according to claim 1, further comprising:
   when failing to obtain the subscription data, sending, by the converged mobility management network element, second indication information to the UE, wherein the second indication information indicates that current access to the first network by the UE is rejected.

3. The method according to claim 2, wherein the second indication information comprises a cause value indicating implicit detach or a cause value indicating a protocol error unspecified.

4. The method according to claim 1, further comprising:
   when succeeding in obtaining the subscription data, resetting, by the converged mobility management network element, the continuous cumulative quantity of times.

5. The method according to claim 1, wherein before updating, by the converged mobility management network element, the continuous cumulative quantity of times, the method further comprises:
   determining, by the converged mobility management network element, that no radio access technology access permission restriction information corresponding to the UE exists, or that radio access technology access permission restriction information corresponding to the UE indicates that the UE is allowed to access the first network.

6. The method according to claim 5, further comprising:
   when the radio access technology access permission restriction information corresponding to the UE indicates that the UE is not allowed to access the first network, sending, by the converged mobility management network element, the first indication information to the base station device.

7. The method according to claim 1, wherein the first indication information comprises an information element indicating that the UE is not handed over to the first network.

8. The method according to claim 1, wherein the converged mobility management network element comprises a mobility management entity (MME) and a serving general packet radio service support node (SGSN).

9. The method according to claim 1, wherein the first network comprises a Long Term Evolution (LTE) network.

10. The method according to claim 1, wherein the second network comprises a general packet radio service (GPRS) network or a universal mobile telecommunications system (UMTS) network.

11. A converged mobility management network element, comprising:
    a transceiver, configured to receive an access request of user equipment (UE), and attempt to obtain, according to the access request, subscription data of the first network corresponding to the UE, wherein the access request requests to access the first network;
    a processor; and
    a non-transitory computer-readable storage medium storing a program to be executed by the processor, the program including instructions for:
       when the transceiver fails to obtain the subscription data, update a continuous cumulative quantity of times, wherein the continuous cumulative quantity of times indicates a cumulative quantity of continuous failures of accessing the first network by the UE;
    wherein the transceiver is further configured to, when the continuous cumulative quantity of times meets a preset condition, send first indication information to a base station device of a second network, wherein the first indication information instructs not to select the first network for the UE for access.

12. The converged mobility management network element according to claim 11, wherein the transceiver is further configured to, when failing to obtain the subscription data, send second indication information to the UE, wherein the second indication information indicates that current access to the first network by the UE is rejected.

13. The converged mobility management network element according to claim 12, wherein the second indication information comprises a cause value indicating implicit detach or a cause value indicating a protocol error unspecified.

14. The converged mobility management network element according to claim 11, wherein the program further includes instructions for: when the transceiver unit succeeds in obtaining the subscription data, reset the continuous cumulative quantity of times.

15. The converged mobility management network element according to claim 11, wherein the program further includes instructions for determining that no radio access technology access permission restriction information corresponding to the UE exists, or the radio access technology access permission restriction information corresponding to the UE indicates that the UE is allowed to access the first network.

16. The converged mobility management network element according to claim 15, wherein the transceiver is further configured to: when the radio access technology access permission restriction information corresponding to the UE indicates that the UE is not allowed to access the first network, send the first indication information to the base station device.

17. The converged mobility management network element according to claim 11, wherein the first indication information comprises an information element indicating that the UE is not handed over to the first network.

18. The converged mobility management network element according to claim 11, wherein the converged mobility management network element comprises a mobility management entity (MME) and a serving general packet radio service support node (SGSN).

19. The converged mobility management network element according to claim 11, wherein the first network comprises a Long Term Evolution (LTE) network.

20. The converged mobility management network element according to claim 11, wherein the second network comprises a general packet radio service (GPRS) network or a universal mobile telecommunications system (UMTS) network.

* * * * *